United States Patent
Fukuda et al.

(10) Patent No.: US 10,768,773 B2
(45) Date of Patent: Sep. 8, 2020

(54) DYNAMIC TEXT SCROLL CONTROL IN A USER INTERFACE

(71) Applicant: International Business Machines Corporation, Armonk, NY (US)

(72) Inventors: Susumu Fukuda, Fujimino (JP); Yoshio Horiuchi, Hiratsuka (JP); Satoko Kinoshita, Yokohama (JP); Kinichi Mitsui, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 921 days.

(21) Appl. No.: 14/950,110

(22) Filed: Nov. 24, 2015

(65) Prior Publication Data

US 2017/0147175 A1    May 25, 2017

(51) Int. Cl.
    G06F 3/0481   (2013.01)
    G06F 3/0485   (2013.01)
    G06F 9/451    (2018.01)

(52) U.S. Cl.
    CPC .......... *G06F 3/0481* (2013.01); *G06F 3/0485* (2013.01); *G06F 9/451* (2018.02)

(58) Field of Classification Search
    CPC .............................. G06F 3/0481; G06F 3/0485
    See application file for complete search history.

(56) References Cited

U.S. PATENT DOCUMENTS

| | | | |
|---|---|---|---|
| 9,087,412 B2 | 7/2015 | Fulks et al. | |
| 2003/0007015 A1* | 1/2003 | Laffey | G06F 3/04842 715/860 |
| 2004/0095401 A1* | 5/2004 | Tomimori | G06F 9/451 715/864 |
| 2004/0215764 A1* | 10/2004 | Allen | H04L 41/12 709/224 |
| 2006/0253791 A1* | 11/2006 | Kuiken | G06F 3/0481 715/766 |
| 2007/0162859 A1* | 7/2007 | Yakowenko | G06F 3/0482 715/733 |

(Continued)

FOREIGN PATENT DOCUMENTS

| | | |
|---|---|---|
| JP | 11073292 A | 3/1999 |
| JP | 2003030687 A | 1/2003 |

(Continued)

OTHER PUBLICATIONS

David Cousins "Introducing Data Structures with Java", published on Mar. 18, 2013 by Pearson Education India, Chapter 8.2 and 8.2.2, Web ISBN-13: 978-93-325-1062-3 (Year: 2013).*

(Continued)

*Primary Examiner* — Ryan Barrett
(74) *Attorney, Agent, or Firm* — IBM Patent Center

(57) ABSTRACT

Embodiments of the present invention provide a method and system for displaying overlapping text elements on a graphical user interface. Initially, it is determined, whether a first display elements overlaps a second display element. If, the first display elements overlaps the second display element, then a text stack is created of all overlapping display elements. Only an identified display element is displayed on the text stack. Finally, a scroll mechanism is provided which allows a user to scroll through and display the first and second set of display elements which overlap.

20 Claims, 7 Drawing Sheets

(56) References Cited

U.S. PATENT DOCUMENTS

| | | | | |
|---|---|---|---|---|
| 2008/0052638 | A1* | 2/2008 | Frank | G06K 9/00476 715/808 |
| 2009/0077501 | A1* | 3/2009 | Partridge | G06F 3/048 715/846 |
| 2011/0072009 | A1* | 3/2011 | Tuttle | G06F 3/0481 707/722 |
| 2012/0218289 | A1* | 8/2012 | Rasmussen | G06T 11/206 345/619 |
| 2012/0229511 | A1* | 9/2012 | Irimoto | G06F 3/0481 345/634 |
| 2013/0226928 | A1* | 8/2013 | Bier | G06F 17/278 707/741 |
| 2013/0257903 | A1* | 10/2013 | Hao | G06F 17/30994 345/629 |
| 2014/0049564 | A1* | 2/2014 | Borger | G06T 1/00 345/660 |
| 2014/0095972 | A1* | 4/2014 | Molesky | G06F 17/211 715/227 |
| 2014/0101602 | A1* | 4/2014 | Barrett | G06F 3/0485 715/784 |
| 2014/0168205 | A1* | 6/2014 | Naveh | G06F 3/0485 345/419 |
| 2014/0358913 | A1* | 12/2014 | Cai | G06F 17/3053 707/728 |
| 2015/0077433 | A1 | 3/2015 | Dai et al. | |

FOREIGN PATENT DOCUMENTS

| | | |
|---|---|---|
| JP | 2007018187 A | 1/2007 |
| JP | 2009157816 A | 7/2009 |

OTHER PUBLICATIONS

StackExchange, "Help with removing duplicate reversed pairs in relational algebra", published on Oct. 25, 2015, [online] https://dba.stackexchange.com/questions/119139/help-with-removing-duplicate-reversed-pairs-in-relational-algebra (Year: 2015).*

Merriam-Webster, definition of "opposite", [online] https://www.merriam-webster.com/dictionary/opposite (Year: 2018).*

Techopedia, "Video Buffer", published on Apr. 23, 2015, [online] https://web.archive.org/web/20150423125539/https://www.techopedia.com/definition/13236/video-buffer (Year: 2015).*

Beaudouin-Lafon, "Novel Interaction Techniques for Overlapping Windows," Nov. 2001, https://dl.acm.org/doi/10.1145/502348.502371.*

\* cited by examiner

100 # DYNAMIC TEXT SCROLL CONTROL IN A USER INTERFACE

BACKGROUND OF THE INVENTION

The present invention relates generally to the field of user interface functions, and more particularly to displaying overlapping text elements using a text scroll control bar.

Electronic devices such as cellular phones, smart phones, mobile phones, Wi-Fi phones, laptop computers, tablet computers, netbooks, handheld computers, personal organizers, e-reading devices, gaming devices and the like, may provide a graphical user interface that allows users to easily interact with the various functionalities of the electronic device. Many graphical user interfaces provide a zoom feature, which allows a user to increase or decrease the size of an object on the display. A zooming feature may be useful when the viewing information is larger than the screen size. Alternatively, a zooming feature may be useful when the viewing information is significantly smaller than the screen size, making either text or figure details difficult to visualize.

SUMMARY

According to one embodiment of the present invention, a method for dynamic text scroll control in a user interface is provided, the method comprising: determining, by one or more processors, whether a first set of display elements overlap with a second set of display elements; in response to determining the first set display elements overlap with a second set of display elements, creating, by one or more processors, at least one text stack, wherein the at least one text stack comprises a subset of the first set of display elements and the second set of display elements which overlap; identifying, by one or more processors, at least one display element of the at least one text stack, wherein only the identified at least one display element of the at least one text stack is displayed; and providing, by one or more processors, a scroll mechanism, wherein the scroll mechanism allows a user to scroll through and display the first and second set of display elements which overlap.

Another embodiment of the present invention provides a computer program product for dynamic text scroll control in a user interface, based on the method described above.

Another embodiment of the present invention provides a computer system for dynamic text scroll control in a user interface, based on the method described above.

DETAILED DESCRIPTION

The embodiments of the present invention will be described in the context of a computing device and a corresponding user interface. Computing devices, such as mobile phones, tablet computers, laptop computers, personal computers, e-readers, or any other electronic devices having a graphical user interface (GUI) allow a user to interact with the device through various input/output (I/O) interfaces. The GUI of an electronic device is capable of representing information from the electronic device to the user. Specifically, the GUI depicts a user interface (e.g., icons). Additionally, the GUI, for example, can include a traditional display screen or a touch screen.

Electronic devices will commonly utilize a sensory input device wherein the user, through various sensory oriented means, controls the electronic device. Sensory input devices convert a physical act by the user to an analog or digital command to the electronic device, thereby allowing a user to interact and instruct the electronic device. For example, a sensory input device can include a mouse, a keyboard, a microphone, a touchpad and a touchscreen, etc.

Embodiments of the present invention may be utilized in a plurality of environments and functions. Many GUIs utilize a zooming feature which is useful when viewing information on a display. For example, zooming-in increases a magnification providing more details of the viewing information. Alternatively, zooming-out decreases a magnification providing less details, but permits a user to view a global overview of the viewing information.

If the viewing information is larger than the screen size, the user may not appreciate the entirety of the displayed text and or graphical aspects of the viewing information. For instance, a geographic map contains both text and pictorial information, where the text positions on the pictorial information are an important aspect of the viewing information. If zooming out uniformly of both the pictorial and text aspects, the text may become too small and unreadable while the pictorial aspects make more sense. If however, the text size is kept unchanged while zooming out, eventually, adjacent text areas may overlap also causing the text to be unreadable. Embodiments of the present invention provide an efficient method to effectively display both text and pictorial viewing information.

Figure 1:
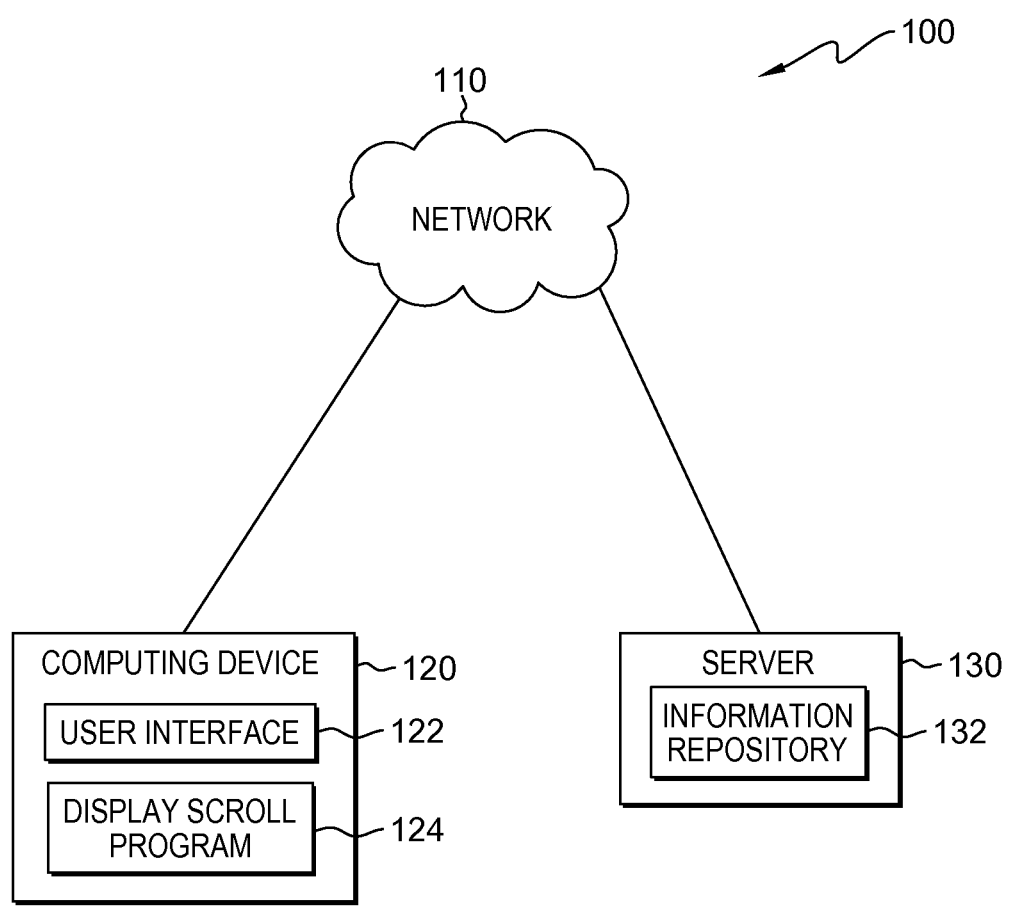
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes computing device 120 and server 130, interconnected over network 110

Greater or fewer components may alternatively be implemented. While FIG. 1 shows computing device 120 having various components, it is understood that implementing all of the illustrated components is not a requirement. For example, computing device 120 may include internal and external hardware components, as depicted and described in further detail with respect to FIG. 5. Data processing environment 100 may include additional computing devices, servers or other devices not shown.

Network 110 may be a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between computing device 120 and server 130, in accordance with embodiments of the invention. Network 110 may include wired, wireless or fiber optic connections Computing device 120 includes user interface 122 and display scroll program 124. In various embodiments of the present invention, computing device 120 may be a laptop computer, a tablet computer, a netbook computer, a personal computer (PC), a desktop computer, a personal digital assistant (PDA), a smart phone, or any programmable electronic device capable of communicating with server 130 via network 110. Computing device 120 may include internal and external hardware components, as depicted and described in further detail with respect to FIG. 5.

User interface 122, may be, for example, a graphical user interface (GUI) or a web user interface (WUI) and can display text, documents, web browser windows, user options, application interfaces, and instructions for operation. A user interface, such as UI 122, refers to the information (such as graphic, text, and sound) a program presents to a user and the control sequences the user employs to control the program. There are many types of user interfaces that allow users to interact with electronic devices, such as a computer keyboard and mouse, through graphical icons and visual indicators, such as secondary notation, as opposed to text-based interfaces, typed command labels, or text navigation.

User interface 122 is a means by which a user interacts with computing device 120. User interface 122 is capable of receiving data, user commands, and data input modifications from a user. User interface 122 is also capable of communicating with display scroll program 124. In other embodiments, user interface 122 may be integrated with display scroll program 124.

Display scroll program 124 can be an application, plug-in, service, or a built-in functionality for implementation on user interface 122 of computing device 120. Display scroll program 124, once invoked, is a user interface element, which assists displaying text areas on a display in an easily readable manner. Display scroll program 124, once invoked, detects overlapping text, and stacks overlapping text, allowing a user to clearly observe the displayed information. Display scroll program 124, once triggered, displays a small controller, allowing a user to scroll through the stacked text. Display scroll program 124 allows a user of computing device 120, using user interface 122, to operate a scroll bar to alter the displayed text areas in a sequential order while maintaining a clear view of displayed information.

In an embodiment display scroll program 124 detects text on user interface 122 that overlaps. Display scroll program 124 may analyze the overlapping text area(s) and determine how to improve a user's ability to view all the text on the screen by stacking the overlapping text.

In the exemplary embodiment, server 130 is a server computer. In other embodiments, server 130 may be a management server, a web server or any other electronic device capable of receiving and sending data. In another embodiment, server 130 may represent a server computing system utilizing multiple computers as a server system, such as in a cloud computing environment. Server 130 contains an information repository 132.

Information repository 132 may include any suitable volatile or non-volatile computer readable storage media, and may include random access memory (RAM) and cache memory (not depicted in FIG. 1). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information. Information repository 132 can be implemented using any architecture known in the art such as, for example, a relational database, an object-oriented database, and/or one or more tables. Information repository 132 may contain lookup tables, databases, charts, graphs, functions, equations, and the like that display scroll program may access. While depicted on server 130, in the exemplary embodiment, information repository 132 may be on a remote server or a "cloud" of computers interconnected by one or more networks utilizing clustered computers and components to act as a single pool of seamless resources, accessible to display scroll program 124 via network 110.

Figure 2:
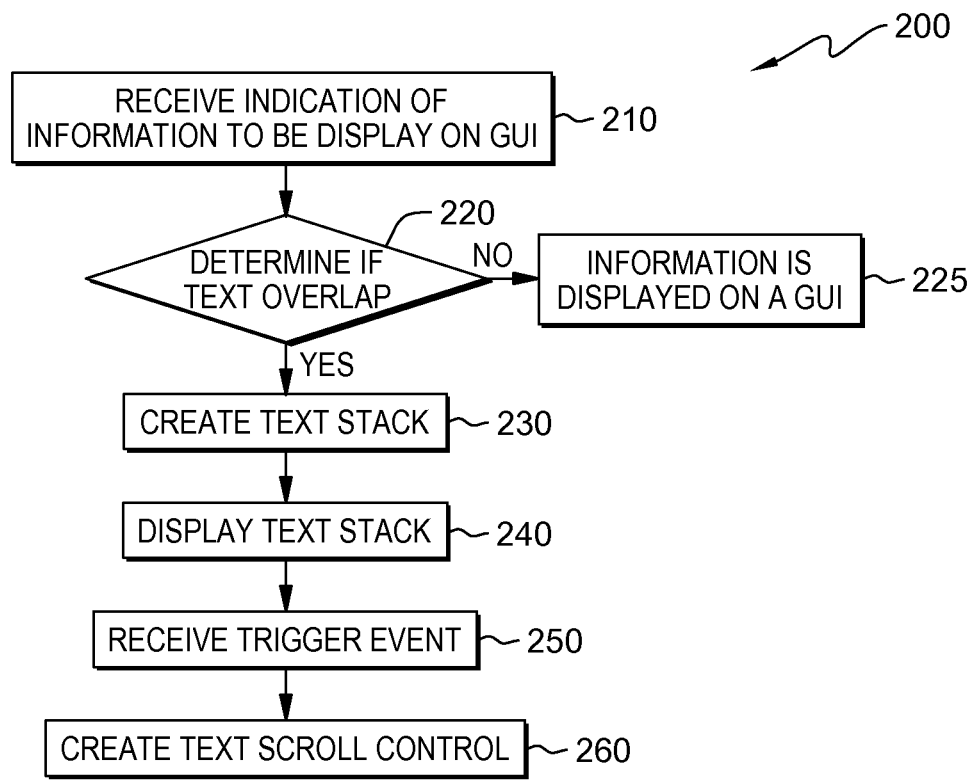
FIG. 2 is a flowchart illustrating operational steps for altering content in a display, in accordance with an embodiment of the present invention.

Reference is now made to FIG. 2. FIG. 2 is flowchart 200 depicting operational steps of display scroll program 124, in accordance with an embodiment of the present invention. Flowchart 200 represents the operational steps for creating a user friendly environment in which pictorial and text elements are displayed on a graphical user interface, similar to that of user interface 122.

The following terms are used to describe flowchart 200. A display area is where a portion of information is displayed on a graphical user interface, such as a display. Text area is a string text displayed on a graphical user interface, such as a display. Text area is usually a rectangle however, text area may be in a more complex shape. Zoom control is a user interface element by which the zoom scale of a display area is set. Display scroll control is a user interface element which controls the display area, allowing a user to scroll right, left, up and/or down in order to view pictorial and text elements not able to fit on the display at the current zoom setting. Text scroll control is a user interface element by which the display of one or more text areas is changed.

In step 210, display scroll program 124 receives an indication that information is to be displayed on display area, via user interface 122. Responsive to detecting that a user has opened an item which displays text (i.e., program, application, file, etc.) on a GUI, display scroll program 124 can be operated. Display scroll program 124 detects pictorial and/or text areas on a GUI display.

In step 220, display scroll program 124 determines if text overlaps. For example, once a zoom scale is set for the information to be displayed text may or may not overlap. If based on the current zoom scale setting, no text overlaps, then, in step 225, display scroll program 124 displays the information on a GUI. It is noted that various application specific policies may determine what to or not to display for a given situation. For example, regarding a map, residential street names may be removed from the display when the zoom scale is set to a specific size. Further, if the zoom scale is set to a larger scale (for instance, 1,000 miles) the map may only display major interstate highways.

Figure 3A:
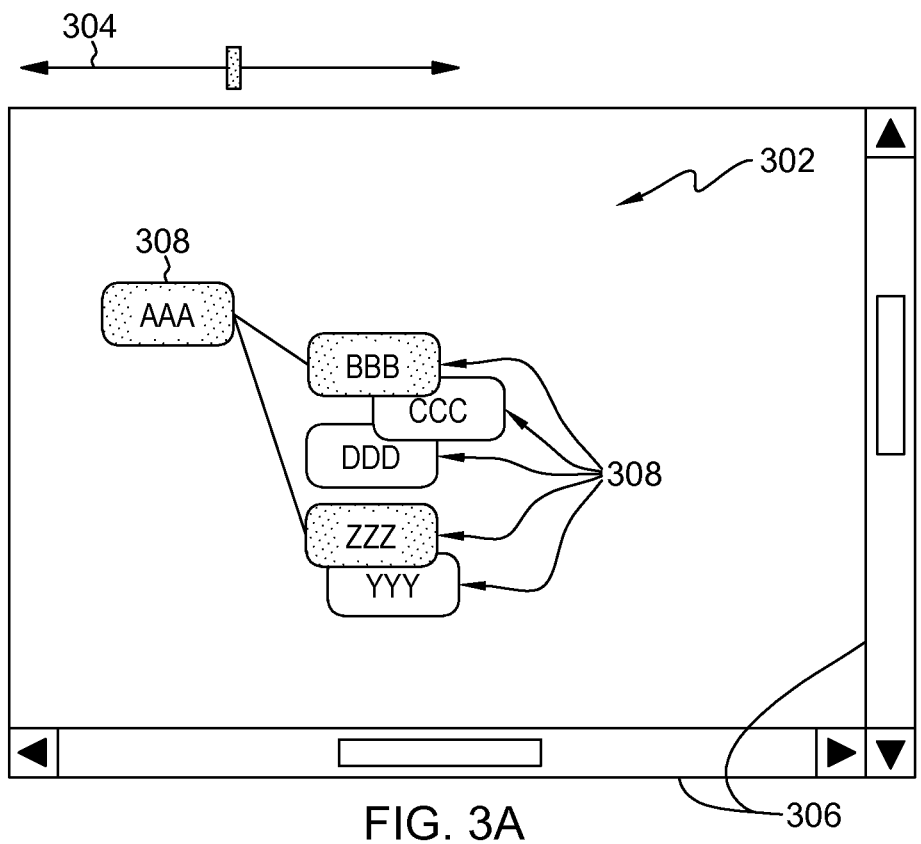
FIGS. 3A-3E illustrate an exemplary user interface depicting a display of a text scroll controller, in accordance with an embodiment of the present invention.

For example, FIG. 3A depicts an exemplary display area 302 with text areas 308 overlapping. Display area 302 is a GUI displaying only a specific portion of the entirety of the display information via a user interface 122. Zoom scale 304 allows a user to set a specific zoom to focus in on a certain part of the information displayed on a user interface 122. Display scroll control 306 allows a user to scroll across an entire page to view a specific portion of the page. For exemplary purposes, text area AAA 308 has no overlapping text. In contrast, text area BBB 308 is part of a grouping of three text areas with overlapping text: that of text area CCC 308 and text area DDD 308. Similarly, text area ZZZ 308 is part of a grouping of two text areas with overlapping text, overlapping with that of text area YYY 308.

Alternatively, if it is determined that text areas do overlap at a given zoom setting, then in step 230, display scroll program 124 creates a text stack. A text stack is created when text areas to be displayed on user interface 122 is determined to overlap. If it is determined that text areas overlap, then only one text area is displayed and the other text areas are hidden. The hidden text areas are associated with and stacked on top of one another, behind the displayed text area. As a result, overlapping text areas are divided into groups, with each group of text areas displaying only one text area and hiding the remainder of the text areas.

In an embodiment, creating a text stack of step 230, may be split into several small steps. First, any text area that is not overlapping is displayed. Second, all overlapping text areas on user interface 122 may be split into respective groups. Of the respective groups, only one text area is displayed to user on user interface 122, and the remainder of the overlapping text areas are not displayed. Finally, the text areas not displayed may be considered behind the displayed text area. This approach in step 230 is repeated for each overlapping text area.

Figure 3B:
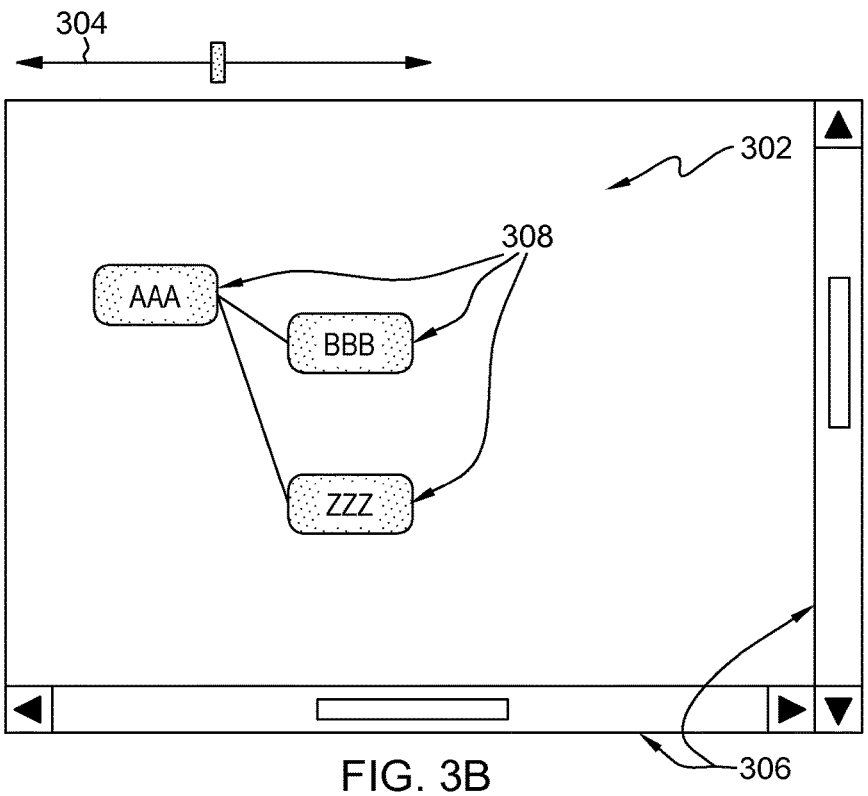

In step 240, display scroll program 124 displays each text stack on user interface 122 of computing device 120. Reference FIG. 3B for an exemplary depiction. Specifically, FIG. 3B stacks and hides any text areas that were overlapping. Comparing FIG. 3A and FIG. 3B, text area AAA 308 had no overlapping text, and therefore remains unchanged in FIG. 3B. In contrast, text area BBB 308 is part of a grouping with three overlapping texts, with text area CCC 308 and text area DDD 308 (per FIG. 3A). In FIG. 3B, text area CCC 308 and text area DDD 308 are no longer displayed on display area 302 as they are hidden behind text area BBB 308. Similarly, text area YYY 308 is hidden behind text area ZZZ 308.

In step 250, display scroll program 124 receives a trigger event to create a text scroll control. The triggering event may be caused by a specific user input. The triggering event may be accomplished by any known means in the art. For example, using a pointing device like a mouse and clicking on a node, by key input using a key board or finger gestures on a touch panel. Other triggering events known in the art may be used to trigger the creation and/or location of text scroll control.

Figure 3C:
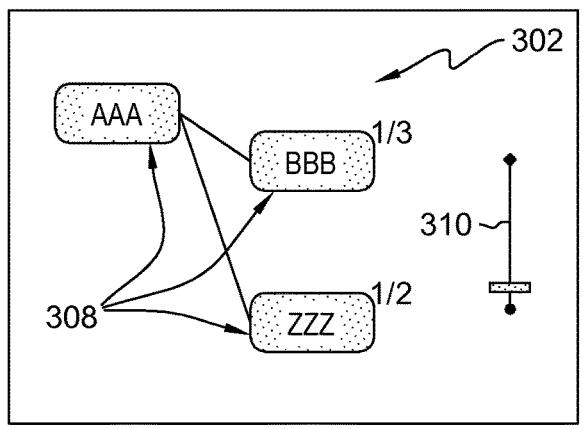

In step 260, display scroll program 124 creates text scroll control, and displays on display area of user interface 122. Text scroll control is used to switch between the displayed text areas of each text group. Text scroll control may be displayed as a slide bar (as depicted in FIG. 3C). Alternative embodiments of text scroll control may be used.

Text scroll controller scrolls through the texts in each text grouping, displaying each text grouping on the display area. Text areas in each grouping maybe in a determined order, so that the text scroll controller may scroll through each and every text area, and display the text to the user.

In an embodiment, there may be an annotated number displayed near the text areas indicating the specific displayed text area. Referencing FIGS. 3A, 3C and 3D, portrays an exemplary embodiment of overlapping text areas with displayed annotated numbers. For instance, FIG. 3A illustrates text area BBB 308 has three overlapping text areas. Therefore FIG. 3C illustrates, aside text area BBB 308, the annotated number is '1/3', where 'one' represents text area one (BBB) is shown out of 'three' overlapping text areas. Similarly FIG. 3A illustrates text area ZZZ 308 has two overlapping text areas. Therefore, FIG. 3C illustrates, aside text area ZZZ 308, the annotated number is '1/2', where 'one' represents text area one (ZZZ) is shown out of 'two' overlapping text areas.

Figure 3D:
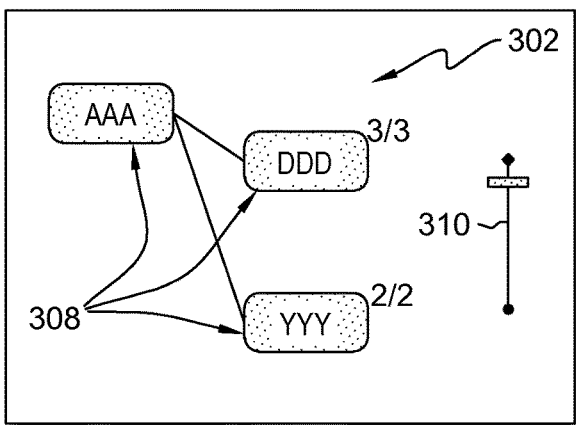

FIG. 3D depicts text scroll controller 310 scrolling through the hidden overlapping text areas. For instance, FIG. 3D illustrates, an annotated number is '3/3', aside text area DDD 308, representing DDD is the third of three overlapping text areas. Similarly, FIG. 3D illustrates, an annotated number is '2/2', aside text area YYY 308, representing YYY is the second of two overlapping text areas. Therefore, utilizing text scroll controller 310 a user can scroll through all stacked text areas instead of viewing overlapping text areas.

In an embodiment, text scroll controller may be limited to a specific text grouping. In an exemplary embodiment, text scroll controller may scroll through only one text grouping. In a second exemplary embodiment example, text scroll controller may scroll through all text groupings displayed on user interface 122. In a third example, text scroll controller may control a subset of all the text areas displayed on user interface 122.

Figure 3E:
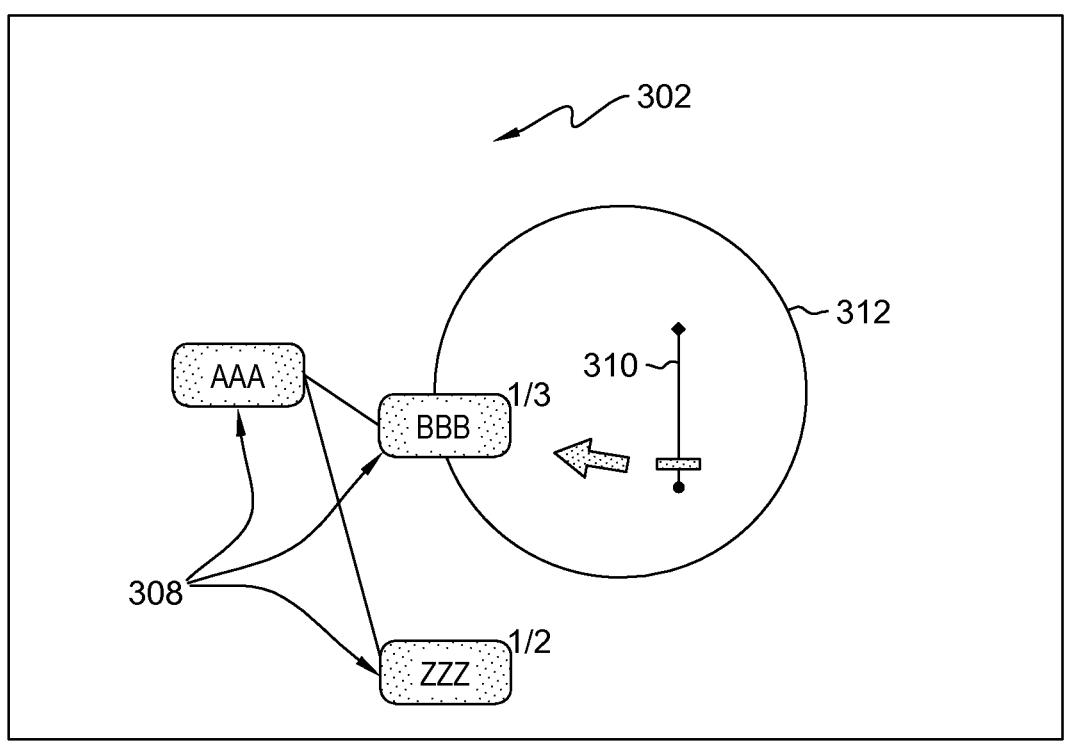

Expounding on the third exemplary embodiment, text scroll controller 310 may control a specific subset of text areas. FIG. 3E, illustrates a case where a specific subset of text areas are manipulated together. Only text area BBB 308 is being manipulated as it falls within a certain defined circle 312 surrounding text scroll controller 310. Therefore text scroll controller 310 only scrolls text area within its diameter. Instead of text scroll controller 310 selecting all text areas, only text areas within a predefined distance from where text scroll controller is triggered (per step 250) may be manipulated. Thus, in an embodiment as illustrated by FIG. 3E, text area BBB 308 is manipulated while text areas AAA 308 and text area ZZZ 308 remain unchanged. In an alternative embodiment, text scroll controller may manipulate only a predefined number of text areas. In an alternative embodiment, a user may select specific text areas which are controlled by text scroll controller.

In an embodiment, text scroll controller may switch the display of each grouping at the differing speed, such that, each text grouping may switch the displayed text at different intervals as the text scroll controller scrolls. For example, a text scroll controller may switch the display between one or more text area groupings at the same time. If the text scroll controller is selected to control two or more text area groupings, the text scroll controller may switch the display of each grouping at the same speed. For instance, in an embodiment, if the text scroll controller resembles text scroll controller 310, then all the text areas are displayed as the scroll passes between the end bars. In an embodiment, if the text scroll controller is manipulated by a touch style gesture, each group may switch the displayed text areas in the same speed and keep switching in a circular manner. Alternatively, if the text scroll controller is manipulated by a touch style gesture, each group may switch independently.

In an embodiment, text scroll may be manual or automatic. For example, automatic text scroll may scroll through a group of text areas automatically. Groups of text areas that are subject to an automatic text scroll may include: all groups in the display area, a selected subset of groups in the display area or a specific text group in the display area.

Flowchart 200 depicting display scroll program 124 repeats as necessary. For example, when a change in the viewing information is detected, step 210 of display scroll program 124 is initiated. In an embodiment if a user may change the zoom scale 304 on display area 302, then previously hidden and displayed text areas may not be properly represented on display area 302, therefore, step 210 of display scroll program 124 is initiated.

In an embodiment, changing zoom scale 304, either larger or smaller, results in previously hidden and displayed text areas changing on display area 302, to better represent new overlapping text areas. However, if the change in zoom scale 304 is minor, then previously set displayed and hidden text areas may change, thereby not reflect the last selection. Alternatively, previously set text areas, both displayed and hidden, may always remain unchanged. In an embodiment, precedence order relation mechanism (order relation) may be utilized to recall and invoke previous text area grouping selections. Generally, order relations represent a listing of pairs of numbers that symbolize a partial order between text areas. In an order relation pairing, text areas are given a number, similar to that of the annotated numbers as depicted in FIG. 3C and FIG. 3D. For each number pair, the left number proceeds over the number on the right side, meaning that there was an instance when the left number was displayed, and the right number was hidden.

Figure 4A:
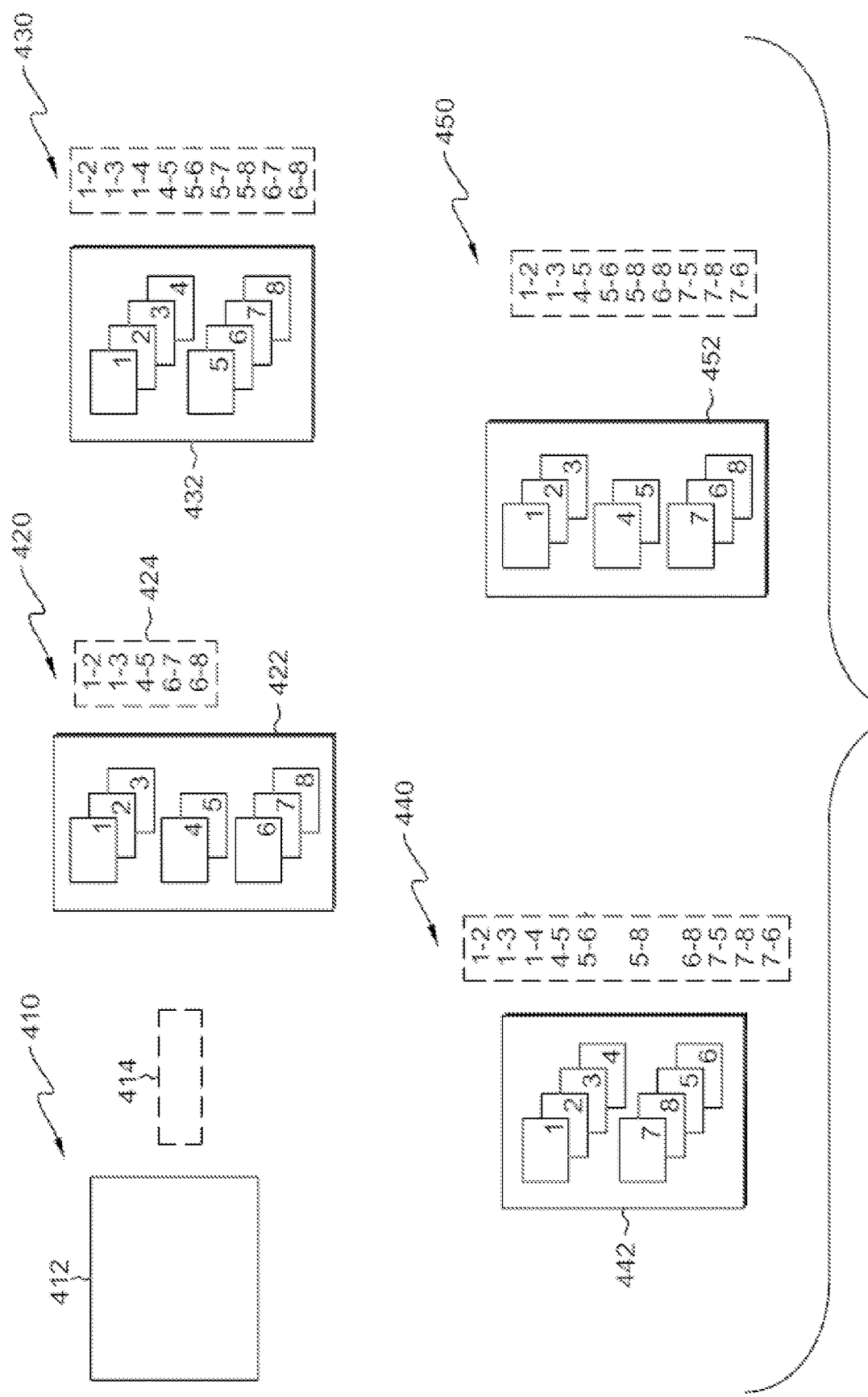
FIGS. 4A-4D illustrate an exemplary embodiment of precedence order relation to recall previous text scroll selections, in accordance with an embodiment of the present invention.

FIG. 4A illustrates an exemplary embodiment, of an order relation to recall previous text scroll selections, in accordance with an embodiment of the present invention. It is noted, that 1-8 represent individual text area, over a period of time Embodiment 410 represents time at T=0, when display 412 and order relation 414 are initially empty. Display 412 and order relation 414 are empty as display scroll program 124 has not received information to display (per step 210).

Embodiment 420, represents time at T=1, where display scroll program 124 displays, on display area 422, text areas 1, 4, 6, while text areas 2, 3, 5, 7, and 8 are hidden. Display scroll program 124 groups the 8 different text areas into 3 separate groupings. Order relation 424 is updated to represent the corresponding displayed text groupings. The left column of order relation 424, represents the displayed text areas, while a corresponding right column represents hidden text areas.

Embodiment 430, represents time at T=2, where display scroll program 124 establishes new text area groupings as display area 432 is zoomed out. Display scroll program 124 displays, on display area 432, text areas 1 and 5 while text areas 2, 3, 4, 6, 7, and 8 are hidden. Therefore, the order relation is updated and ordered based on the precedence. For illustration, order relation pair 1-2, 1-3, 4-5, 6-7, and 6-8, are carried over from embodiment 420 at time T=1. It is noted that the order relation is looked up (from the previous embodiment), and text areas in a group are ordered based on the precedence memorized in the order relation pairing. In an embodiment, the order relation may provide a partial precedence between text areas as the overall system may have to set the total order complemented by additional information, such as, alphabetic order, numerical order, etc.

In an embodiment, precedency may be considered between only two text areas in the same group in order to keep the relation small. For example, reference embodiment 440 of FIG. 4A. Alternative embodiments may utilize precedence between different quantities of text areas in the same group. For instance, if a larger precedence is remembered, it would allow for cross group precedence to be recalled for future selection. Thereby utilizing a large precedence it may provide a better user experience as display scroll program 124 may recall and invoke the previous text area order. For example, embodiment 450 of FIG. 4A portrays grouping 7, 6 and 8, in a different order than embodiment 420, due to the limitation of order precedence recalling only two text areas. However, allowing cross group precedence by not limiting the order relation would result in a larger order relation.

As operations such as zoom-in, zoom-out, and text scroll are conducted, often new precedence between text areas is established, and conflict with previous memory. Embodiment 440, represents time at T=3, when a user actively scrolls through the text groupings, thereby creating newly specified precedence between text areas. Display 442 depicts a text scroll controller controlling a specific subset of text areas (as previously described in reference to FIG. 3E) specifically text grouping 5, 6, 7 and 8. Per embodiment 440, the newly specified precedence causes two text area conflicts with previous memory. The first conflict is between pairing '5-7' (established at time T=2) and '7-5' (established at time T=3), as both pairings are opposite. Similarly, the second conflict is between pairing '6-7' (established at time T=1) and '7-6' (established at time T=3). To resolve the conflict, the new precedence is remembered and the conflicting previous one is removed.

Embodiment 450 represents time at time T=4, when the user actively zooms-in, thereby re-creating the precedence between text areas at time T=2. However, due to the pairing conflict at time T=3, display area 452 displays text area 7 and hides text area 6 and 8 (as compared to display area 422 which displayed text area 6 and hid text areas 7 and 8).

Figure 4B:
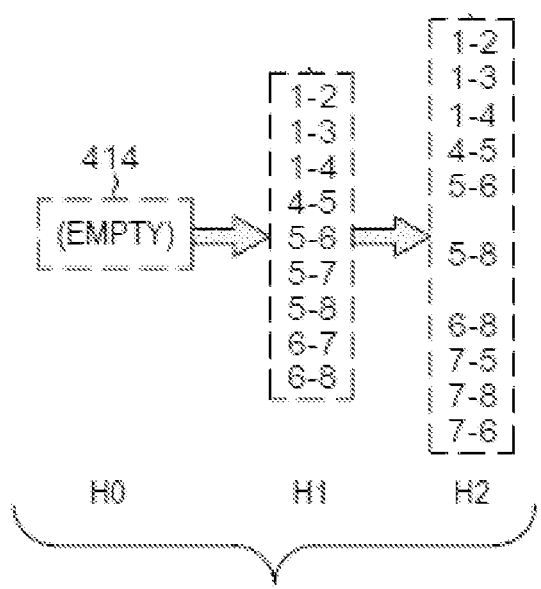
Figure 4C:
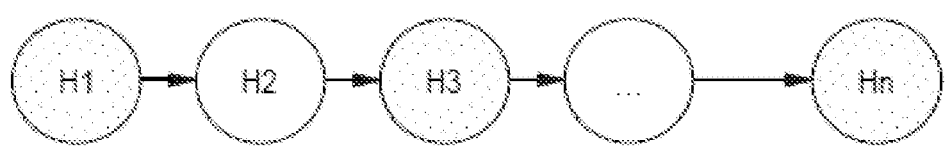
Figure 4D:
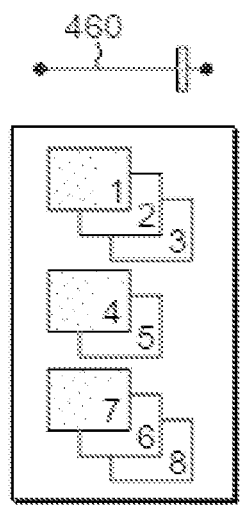

FIGS. 4B-4D, illustrate how an order relation is used to recall history as text areas are manipulated. For example, operations such as zoom-in, zoom-out, and text scroll often create new precedence between text areas. As noted in FIG. 4A, the order relation memorizes only the most recent precedence between two text areas. FIG. 4B illustrates an example of the change where H0 is the initial order relation and H1, and H2 represent an order relation at certain points later in time. (Reference to FIG. 4A: H0 represents embodiment 410, at time T=0, H1 represents embodiment 430 at time T=2 and H2 represents embodiment 440 at time T=3.) It is noted that the chain grows as time order relation changes over time. FIG. 4C demonstrates the history of order relation changes that directly impact the current text scroll. $H_n$, represents the current number of order relation changes. H1, H3, and $H_n$ are highlighted to identify an order relation which affects the current text scroll. If a highlighted order relation is considered, then some of the currently displayed text should be replaced. Therefore, in backwards chronological order $H_n$, H3 and H1 directly affect the current text scroll. FIG. 4D introduces change history controller 460. Change history controller 460 is used for tracing history of order relation changes on a timeline. For example, currently hidden but previously displayed text areas are easily show again.

Embodiments of the present invention provide a method to save and later use an order relation at specific points in time. A saved order relation may be given a name. A saved order relation may be used by the user who created it, or shared with other users on the same system over a network of systems.

Embodiments of the present invention provide a method to save and later use the history of order relation changes. A saved history of order relation changes may be given a name. A saved history of order relation changes may be used by the user who created it, or shared with other users on the same system over a network of systems.

Embodiments of the present invention allow users to share the same order relation where changes on the older relation may be merged and shared among users. For example, a user may access a shared order relation, and any changes the user made, are automatically updated and shared for other users. Sharing order relations may be useful particularly, when the displayed information is public and shared by a large number of users (i.e., a geographical map). If an error occurs in the precedence order between users, the later changes may overwrite the precedence error. Alternatively, the conflicting portions may be separately recorded for each user as personal memory, where the personal memory is precedent to the shared memory. Alternatively, the conflicting precedence is remembered and the precedence that are preferred by more users is selected for a new user. Additional solutions are appreciated by those skilled in the art.

Embodiments of the present invention may also allow a user to pin a text area. A pinned text area is always displayed and never hidden, even during a zoom-in or zoom-out operation. For example, pinned text areas may not be considered for grouping and text scroll. If an unpinned text area(s) overlaps a pinned text area(s), then the unpinned text area(s), may be displayed distantly enough from the pinned text area(s).

Embodiments of the present invention may also allow all hidden text areas of one or more text groups to be momentarily displayed and shown on the display area, thereby allowing user to review all text areas simultaneously.

Figure 5:
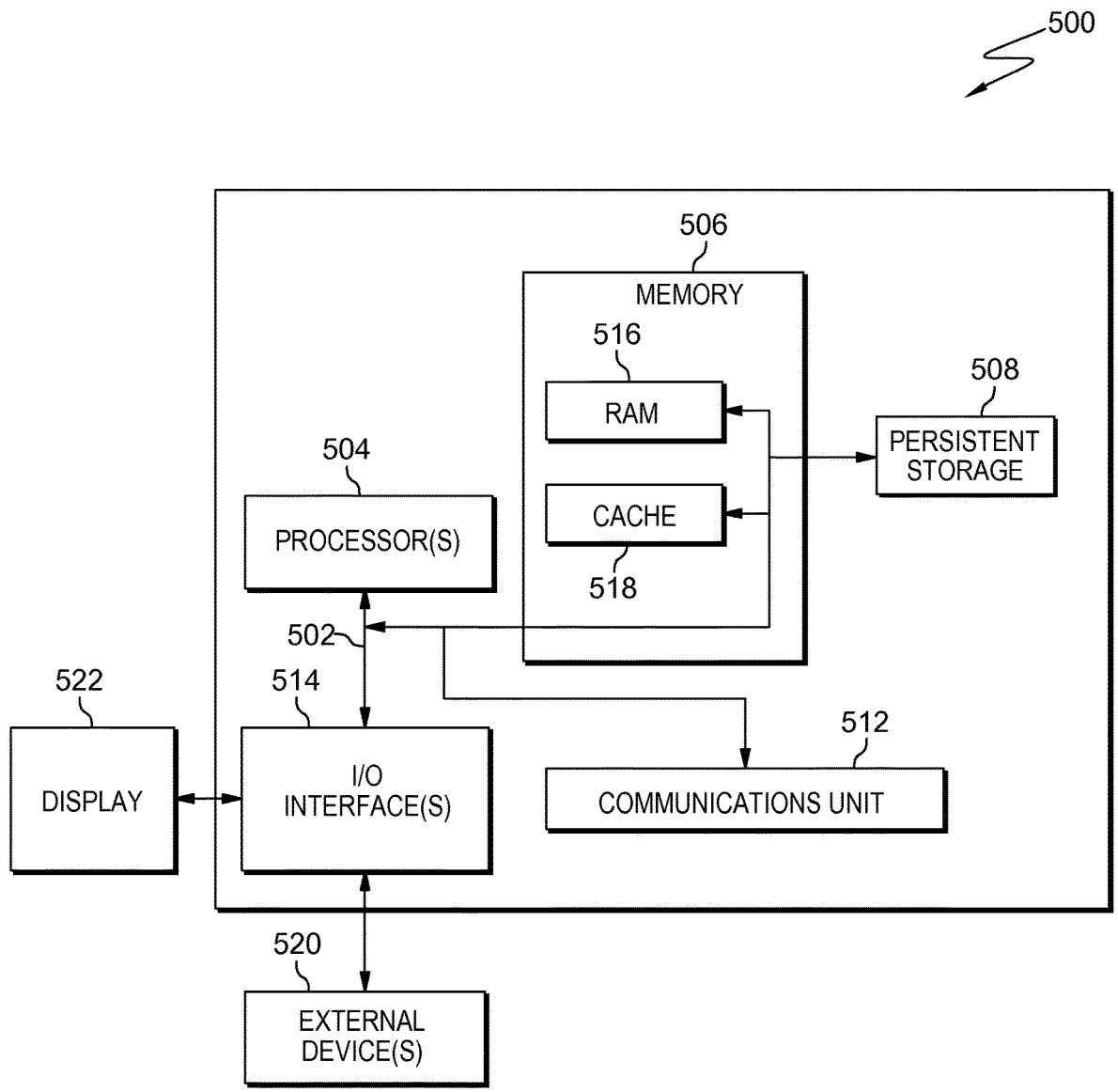
FIG. 5 depicts a block diagram of internal and external components of a data processing system, such as computing device of FIG. 1, in accordance with an embodiment of the present invention.

FIG. 5 is a block diagram of internal and external components of a computer system 500, of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, wearable computing devices, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media. Software (e.g., display scroll program 124) is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 512 provides for communications with other computer systems or devices via a network. In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving instructions to display a plurality of display elements including a first display element and a second display element on a graphical user interface at a first zoom scale size;
   in response to determining that the first display element and second display element overlap when displayed on the graphical user interface at the first zoom scale size, creating a first stack including at least the first display element and the second display element from among the plurality of display elements, each display element within the first stack overlapping at least one other display element within the first stack at the first zoom scale size;

displaying, at the first zoom scale size, only the first display element on the graphical user interface to represent each display element included in the first stack, wherein:

each display element included in the first stack is associated with a respective identifier;

each display element included in the first stack is ordered within the first stack based on a predefined order of identifiers;

the first display element is associated with a first identifier that is first in the predefined order of identifiers among identifiers associated with display elements included in the first stack;

the first display element is displayed on the graphical user interface, at the first zoom scale size, based on the predefined order of identifiers; and the second display element is associated with a second identifier;

storing one or more order relations among the plurality of display elements by storing a respective order relation pair for each order relation, each order relation pair having a first position corresponding to a display element representing a respective stack on the graphical user interface and a second position representing a display element that is hidden, from a user of the graphical user interface, within the respective stack by the display element visually representing the respective stack, an order relation of the first display element and the second display element stored by a first order relation pair having the first identifier of the first display element at the first position and having the second identifier of the second display element at the second position;

in response to receiving instructions to display the second display element on the graphical user interface to represent each display element included in the first stack:

storing a new order relation of the first display element and the second display element by storing a second order relation pair, the second order relation pair having the second identifier of the second display element in the first position and having the first identifier of the first display element in the second position; and deleting the first order relation pair for the first display element and the second display element for conflicting with the second order relation pair.

2. The method of claim 1, further comprising:

receiving instructions to display the plurality of display elements on the graphical user interface at a second zoom scale size;

in response to determining that the first display element and second display element overlap when displayed on the graphical user interface at the second zoom scale size, creating a second stack including at least the first display element and the second display element from among the plurality of display elements, each display element within the second stack overlapping at least one other display element within the second stack at the second zoom scale size; and displaying, at the second zoom scale size, only the second display element on the graphical user interface to represent each display element included in the second stack based on the stored second order relation pair, the new order relation of the first display and the second display element stored by the second order relation pair having precedence over the predefined order of identifiers, wherein the first identifier of the first display element is first in the predefined order of identifiers among identifiers associated with display elements included in the second stack.

3. The method of claim 2, further comprising:

in response to receiving the instructions to display the plurality of display elements on the graphical user interface at the second zoom scale size:

removing a third display element from the second stack in response to determining that the third display element included in the first stack at the first zoom scale size does not overlap, at the second zoom scale size, any other display element among the display elements included in the first stack;

adding the third display element to a third stack at the second zoom scale size; and displaying a fourth display element to visually represent the third stack at the second zoom scale size based on a previously stored third order relation pair including the third display element and the fourth display element, the third order relation pair representing an order relation of the third display element and the forth display element at a previous instance of the plurality of display elements displayed on the graphical user interface at the second zoom scale size, the third order relation pair having an identifier of the fourth display element at a first position and an identifier of the third display element at the second position.

4. The method of claim 3, wherein the second zoom scale size is larger than the first zoom scale size, the graphical user interface displaying the plurality of display elements at the second zoom scale size representing zooming-in on the graphical user interface relative to the first zoom scale size, and the graphical user interface displaying the plurality of display elements at the first zoom scale size representing zooming-out on the graphical user interface relative to the second zoom scale size.

5. The method of claim 1, wherein the instructions to display the second display element on the graphical user interface to represent each display element included in the first stack are generated by a scroll control, the scroll control receiving user input to select display elements from among the display elements included in first stack to display on the graphical user interface to represent the first stack.

6. The method of claim 5, wherein the scroll controller causes the graphical user interface to display, at any one time, any one display element of the display elements included in first stack in a circular manner based on the predefined order and the user input.

7. The method of claim 1, wherein the identifiers associated with the display elements included in the first stack are numerical identifiers and the predefined order of identifiers is a numerical order.

8. A computer program product comprising:

a computer readable storage medium and program instructions stored on the computer readable storage medium, the program instructions comprising:

program instructions to display a plurality of display elements including a first display element and a second display element on a graphical user interface at a first zoom scale size;

program instructions to, responsive to determining that the first display element and second display element overlap when displayed on the graphical user interface at the first zoom scale size, create a first stack including at least the first display element and the second display element from among the plurality of display elements, each display element within the first stack overlapping at least one other display element included in the first stack at the first zoom scale size;

program instructions to display, at the first zoom scale size, only the first display element on the graphical user interface to represent each display element included in the first stack, wherein:
 each display element included in the first stack is associated with a respective identifier;
 each display element included in the first stack is ordered within the first stack based on a predefined order of identifiers;
 the first display element is associated with a first identifier that is first in the predefined order of identifiers among identifiers associated with display elements included in the first stack;
 the first display element is displayed on the graphical user interface, at the first zoom scale size, based on the predefined order of identifiers; and
 the second display element is associated with a second identifier;

program instructions to store one or more order relations among the plurality of display elements by storing a respective order relation pair for each order relation, each order relation pair having a first position corresponding to a display element representing a respective stack on the graphical user interface and a second position representing a display element that is hidden, from user of the graphical user interface, within the respective stack by the display element visually representing the respective stack, an order relation of the first display element and the second display element stored by a first order relation pair having the first identifier of the first display element at the first position and having the second identifier of the second display element at the second position;

program instructions to, responsive to displaying the second display element on the graphical user interface to represent each display element included in the first stack:
 store a new order relation of the first display element and the second display element by storing a second order relation pair, the second order relation pair having the second identifier of the second display element in the first position and having the first identifier of the first display element in the second position; and
 delete the first order relation pair for the first display element and the second display element for conflicting with the second order relation pair.

9. The computer program product of claim 8, the program instructions further comprising:
 program instructions to display the plurality of display elements on the graphical user interface at a second zoom scale size;
 program instruction to, responsive to determining that the first display element and second display element overlap when displayed on the graphical user interface at the second zoom scale size, create a second stack including at least the first display element and the second display element from among the plurality of display elements, each display element within the second stack overlapping at least one other display element within the second stack at the second zoom scale size; and
 program instruction to display, at the second zoom scale size, only the second display element on the graphical user interface to represent each display element included in the second stack based on the stored second order relation pair, the new order relation of the first display and the second display element stored by the second order relation pair having precedence over the predefined order of identifiers, wherein the first identifier of the first display element is first in the predefined order of identifiers among identifiers associated with display elements included in the second stack.

10. The computer program product of claim 9, the program instructions further comprising:
 program instructions to, responsive to receiving the program instructions to display the plurality of display elements on the graphical user interface at the second zoom scale size, execute program instructions to:
 remove a third display element from the second stack in response to determining that the third display element included in the first stack at the first zoom scale size does not overlap, at the second zoom scale size, any other display element among the display elements included in the first stack;
 add the third display element to a third stack at the second zoom scale size; and
 display a fourth display element to visually represent the third stack at the second zoom scale size based on a previously stored third order relation pair including the third display element and the fourth display element, the third order relation pair representing an order relation of the third display element and the forth display element at a previous instance of the plurality of display elements displayed on the graphical user interface at the second zoom scale size, the third order relation pair having an identifier of the fourth display element at a first position and an identifier of the third display element at the second position.

11. The computer program product of claim 10, wherein the second zoom scale size is larger than the first zoom scale size, the graphical user interface displaying the plurality of display elements at the second zoom scale size representing zooming-in on the graphical user interface relative to the first zoom scale size, and the graphical user interface displaying the plurality of display elements at the first zoom scale size representing zooming-out on the graphical user interface relative to the second zoom scale size.

12. The computer program product of claim 8, wherein the program instructions to display the second display element on the graphical user interface to represent each display element included in the first stack are generated by a scroll control, the scroll control receiving user input to select display elements from among the display elements included in first stack to display on the graphical user interface to represent the first stack.

13. The computer program product of claim 12, wherein the scroll controller causes the graphical user interface to display, at any one time, any one display element of the display elements included in first stack in a circular manner based on the predefined order and the user input.

14. A computer system comprising:
one or more computer processors;
one or more computer readable storage media;
program instructions stored on the one or more computer readable storage media for execution by at least one of the one or more processors comprising:
program instructions to display a plurality of display elements including a first display element and a second display element on a graphical user interface at a first zoom scale size;
program instructions to, responsive to determining that the first display element and second display element overlap when displayed on the graphical user interface at the first zoom scale size, create a first stack including at least the first display element and the second display element from among the plurality of display elements, each display element within the first stack overlapping at least one other display element included in the first stack at the first zoom scale size;
program instructions to display, at the first zoom scale size, only the first display element on the graphical user interface to represent each display element included in the first stack, wherein:
each display element included in the first stack is associated with a respective identifier;
each display element included in the first stack is ordered within the first stack based on a predefined order of identifiers;
the first display element is associated with a first identifier that is first in the predefined order of identifiers among identifiers associated with display elements included in the first stack;
the first display element is displayed on the graphical user interface, at the first zoom scale size, based on the predefined order of identifiers; and
the second display element is associated with a second identifier;
program instructions to store one or more order relations among the plurality of display elements by storing a respective order relation pair for each order relation, each order relation pair having a first position corresponding to a display element representing a respective stack on the graphical user interface and a second position representing a display element that is hidden, from a user of the graphical user interface, within the respective stack by the display element visually representing the respective stack, an order relation of the first display element and the second display element stored by a first order relation pair having the first identifier of the first display element at the first position and having the second identifier of the second display element at the second position;
program instructions to, responsive to displaying the second display element on the graphical user interface to represent each display element included in the first stack:
store a new order relation of the first display element and the second display element by storing a second order relation pair, the second order relation pair having the second identifier of the second display element in the first position and having the first identifier of the first display element in the second position; and delete the first order relation pair for the first display element and the second display element for conflicting with the second order relation pair.

15. The computer system of claim 14, the program instructions further comprising:
program instructions to display the plurality of display elements on the graphical user interface at a second zoom scale size;
program instruction to, responsive to determining that the first display element and second display element overlap when displayed on the graphical user interface at the second zoom scale size, create a second stack including at least the first display element and the second display element from among the plurality of display elements, each display element within the second stack overlapping at least one other display element within the second stack at the second zoom scale size; and
program instruction to display, at the second zoom scale size, only the second display element on the graphical user interface to represent each display element included in the second stack based on the stored second order relation pair, the new order relation of the first display and the second display element stored by the second order relation pair having precedence over the predefined order of identifiers, wherein the first identifier of the first display element is first in the predefined order of identifiers among identifiers associated with display elements included in the second stack.

16. The computer system of claim 15, program instructions to, responsive to receiving the program instructions to display the plurality of display elements on the graphical user interface at the second zoom scale size, execute program instructions to:
remove a third display element from the second stack in response to determining that the third display element included in the first stack at the first zoom scale size does not overlap, at the second zoom scale size, any other display element among the display elements included in the first stack;
add the third display element to a third stack at the second zoom scale size; and
display a fourth display element to visually represent the third stack at the second zoom scale size based on a previously stored third order relation pair including the third display element and the fourth display element, the third order relation pair representing an order relation of the third display element and the forth display element at a previous instance of the plurality of display elements displayed on the graphical user interface at the second zoom scale size, the third order relation pair having an identifier of the fourth display element at a first position and an identifier of the third display element at the second position.

17. The computer system of claim 16, wherein the second zoom scale size is larger than the first zoom scale size, the graphical user interface displaying the plurality of display elements at the second zoom scale size representing zooming-in on the graphical user interface relative to the first zoom scale size, and the graphical user interface displaying the plurality of display elements at the first zoom scale size representing zooming-out on the graphical user interface relative to the second zoom scale size.

18. The computer system of claim 14, wherein the program instructions to display the second display element on the graphical user interface to represent each display element included in the first stack are generated by a scroll control, the scroll control receiving user input to select display elements from among the display elements included in first stack to display on the graphical user interface to represent the first stack.

19. The computer system of claim 18, wherein the scroll controller causes the graphical user interface to display, at any one time, any one display element of the display elements included in first stack in a circular manner based on the predefined order and the user input.

20. The computer system of claim 14, wherein the identifiers associated with the display elements included in the first stack are numerical identifiers and the predefined order of identifiers is a numerical order.

\* \* \* \* \*